United States Patent [19]

Kiyota

[11] Patent Number: 5,548,679
[45] Date of Patent: Aug. 20, 1996

[54] DIGITAL PLL SYSTEM

[75] Inventor: Shinichi Kiyota, Tokyo, Japan

[73] Assignee: Kabushiki Kaisha Toshiba, Kawasaki, Japan

[21] Appl. No.: 386,656

[22] Filed: Feb. 10, 1995

[30]  Foreign Application Priority Data

Feb. 10, 1994  [JP]  Japan .................................. 6-016283

[51] Int. Cl.$^6$ ...................................................... H02P 5/17
[52] U.S. Cl. ......................... 388/811; 388/804; 388/911; 388/912; 318/600; 318/607
[58] Field of Search .................................... 388/811, 804, 388/805, 812, 813, 814, 911, 912; 318/600, 607, 608, 254, 138, 439; 375/120, 81, 118; 331/DIG. 2; 455/165, 232

[56]  References Cited

U.S. PATENT DOCUMENTS

| | | | |
|---|---|---|---|
| 4,443,742 | 4/1984 | Schneider | 388/811 X |
| 4,491,771 | 1/1985 | Kimura | 318/254 |
| 4,498,191 | 2/1985 | Rogers | 455/165 X |
| 5,163,035 | 11/1992 | Horikiri | 318/600 X |
| 5,187,722 | 2/1993 | Petty | 375/118 |
| 5,410,571 | 4/1995 | Yonekawa et al. | 375/120 X |
| 5,430,772 | 7/1995 | Lee et al. | 375/118 X |

*Primary Examiner*—William M. Shoop, Jr.
*Assistant Examiner*—Karen Masih
*Attorney, Agent, or Firm*—Oblon, Spivak, McClelland, Maier & Neustadt, P.C.

[57]  ABSTRACT

A PLL system has a phase comparator for converting the phase difference between a reference clock signal and a feedback clock signal corresponding to a PWM signal Into a binary value, a frequency comparator for converting the frequency difference between the reference and feedback clock signals into a binary value, an automatic gain controller for adjusting the loop gain of the PLL system to a given value whenever the output of the frequency comparator reaches a change point, and a PWM signal generator for generating the PWM signal according to the outputs of the phase comparator, frequency comparator, and automatic gain controller. These components of the PLL system process digital signals, to simplify the structure of the PLL system, expand the range of loop gains to be set, and speedily synchronize the feedback clock signal with the reference clock signal.

4 Claims, 3 Drawing Sheets

DIGITAL PLL SYSTEM

BACKGROUND OF THE INVENTION

1. Field of the Invention

The present invention relates to a PLL (phase-locked loop) system for synchronizing a feedback clock signal with a reference clock signal, and particularly, to a PLL system for driving a DC motor or a Hall motor.

2. Description of the Prior Art

FIG. 1 is a block diagram showing an analog PLL system 100 according to a prior art. Components of the PLL system 100 will be explained. An oscillator 101 generates a reference clock signal CF. A converter 103 detects the phase difference between the signal CF and a feedback clock signal CB supplied from an input terminal 102 and converts the phase difference into a voltage. A converter 104 detects the frequency difference between the signals CF and CB and converts the frequency difference into a voltage. The converters 103 and 104 form a PLL block. The converter 103 has a phase comparator 103a and a digital-to-analog (DA) converter 103b. The phase comparator 103a converts the phase difference between the signals CF and CB into a binary value, and the DA converter 103b converts the binary value into an analog voltage. The converter 104 has a frequency comparator 104a and a DA converter 104b. The frequency comparator 104a converts the frequency difference between the signals CF and CB into a binary value, and the DA converter 104b converts the binary value into an analog voltage. The output voltages of the converters 103 and 104 are supplied to a PWM signal generator 106 through a loop filter 105. The PWM signal generator 106 compares these output voltages with a triangular wave of optional amplitude and provides a PWM (pulse width modulation) signal. The PWM signal is supplied to an output terminal 107. The loop filter 105 consists of external resistors and capacitors (not shown) that set the loop gain of the PLL system 100. The resistance and capacitance of these resistors and capacitors are determined according to experimental data. The output terminal 107 is connected to a bridge controller 201 for controlling a direct-current (PC) motor 202. The DC motor 202 is connected to a frequency divider 203, which provides the feedback clock signal CB representing the rotational speed of the motor 202.

When the reference clock signal CF is changed, the feedback clock signal CB must be synchronized with the signal CF. For this purpose, the phase comparator 103a and frequency comparator 104a convert the phase difference and frequency difference between the signals CF and CB into binary values. The DA converters 103b and 104b convert the binary values into analog voltages. A combination of the analog voltages is passed through the loop filter 105 and is converted into a PWM signal by the PWM signal generator 106. According to the PWM signal, the controller 201 drives the DC motor 202, and the frequency divider 203 provides the feedback clock signal CB representing the rotational speed of the DC motor 202. These processes are repeated to synchronize the signal CB with the signal CF.

The analog PLL system of the prior art has the following problems:

(1) The reference and feedback clock signals CF and CB must be converted into binary values by the phase comparator 103a and frequency comparator 104a, then into analog voltages by the DA converters 103b and 104b, and into a PWM signal by the PWM signal generator 106. Namely, the prior art involves three signal conversion processes to complicate the structure of the PLL system, and requires long processing time for providing an output signal.

(2) The PLL system must have the loop filter 105 consisting of external resistors and capacitors. This configuration limits the range of loop gains to be set, since the ripple magnitude manifested on the output waveform of the loop filter 105 increases lineally with the loop gain.

SUMMARY OF THE INVENTION

An object of the present invention is to provide a digital PLL system for controlling a load apparatus such as a motor, the system processes only digital signals, to simplify the structure of the system, expands the range of loop gains to be set, and synchronizes a feedback clock signal with a reference clock signal at a high speed.

In order to accomplish the object, the present invention provides a digital PLL system 10 shown in FIG. 2. The system 10 has a phase comparator 13 for converting the phase difference between a reference clock signal CF and a feed back clock signal CB from the load apparatus into a binary value, (first digital signal) a frequency comparator 14 for converting the frequency difference between the signals CF and CB into a binary value (second digital signal), an automatic gain controller 15 for adjusting the loop gain of the system 10 whenever the frequency difference provided by the frequency comparator 14 reaches a change point, G2 and providing a third digital signal and a PWM signal generator 16 for generating the PWM signal S16 according to the binary values (first, second and third digital signals and loop gain. The phase comparator 13, frequency comparator 14, automatic gain controller 15, and PWM signal generator 16 are digital devices. The comparators 13 and 14 convert the phase difference and frequency difference between the signals CF and CB into binary first and second digital signals. Namely, the comparators 13 and 14 quantize feedback parameters required for PLL control. The automatic gain controller 15 adjusts the loop gain of the system 10 whenever the frequency difference reaches a change point. The PWM signal generator 16 generates the PWM signal S16 according to these data. All of these processes are carried out on digital signals. The PWM signal S16 controls a DC motor 22 of FIG. 2 or a three-phase Hall motor 32 of FIG. 3. The control state of the motor is reflected in the feedback clock signal CB. These processes are repeated to synchronize the signal CB with the signal CF. Unlike the prior art, the present invention requires no digital-to-analog converters and simplifies the signal conversion processes and structure of the PLL system. Since the PLL system of the present invention works on digital signals, it requires no loop filter of the analog PLL system. Accordingly, the present invention expands the range of loop gains to be set. The automatic gain controller 15 automatically adjusts a gain, to speedily synchronize the signal CB with the signal CF.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice. BRIEF DESCRIPTION OF THE DRAWINGS FIG. 1 is a block diagram showing an analog PLL system according to a prior art;

DETAILED DESCRIPTION OF THE EMBODIMENTS

Various embodiments of the present invention will be described with reference to the accompanying drawings.

Figure 1:
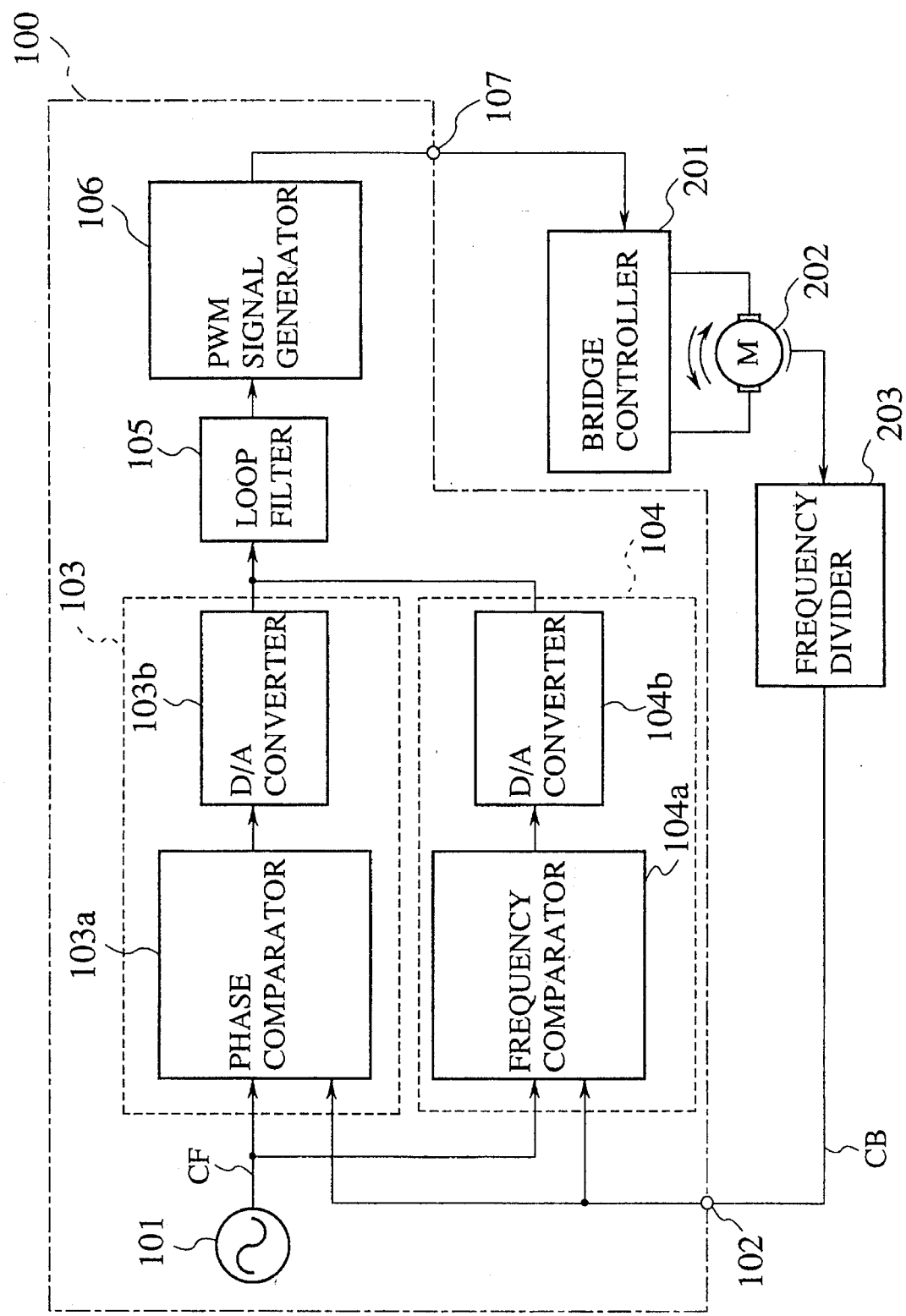
Figure 2:
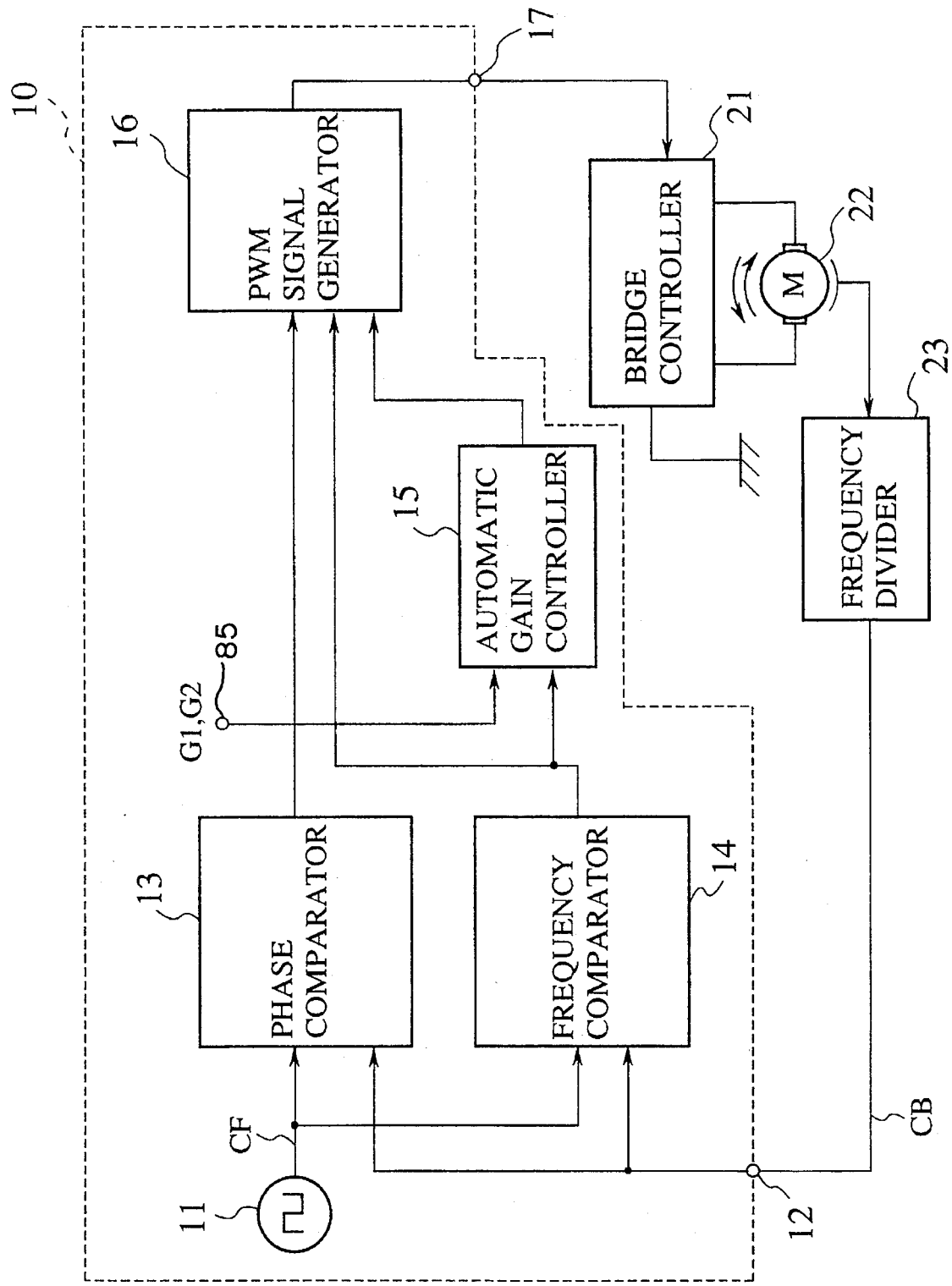
FIG. 2 is a block diagram showing a digital PLL system for driving a DC motor, according to a first embodiment of the present invention.

FIG. 2 shows a digital PLL system 10 according to the first embodiment of the present invention. An oscillator 11 generates a reference clock signal CF. A phase comparator 13 compares the signal CF with a feedback clock signal CB supplied through an input terminal 12 and converts the phase difference between them into a binary value. A frequency comparator 14 compares the signals CF and CB with each other and converts the frequency difference between them into a binary value. An automatic gain controller 15 is connected to the output of the frequency comparator 14. A PWM signal generator 16 is connected to the outputs of the phase comparator 13, frequency comparator 14, and automatic gain controller 15. The automatic gain controller 15 receives the target gain G1, and change point G2, signals through input part 85 and the output of the frequency comparator 14. Whenever the frequency difference provided by the frequency comparator 14 becomes equal to the change point G2, the gain controller 15 changes the loop gain of the PLL system 10 to the target gain G1. The PWM signal generator 16 generates a PWM signal S16 according to the binary values provided by the comparators 13 and 14 and the loop gain provided by the gain controller 15. In this way, all of the components of the digital PLL system 10 such as the phase comparator 13, frequency comparator 14, automatic gain controller 15, and PWM signal generator 16 process only digital signals such as the binary digital signals and digital clock signals. The PWM signal S16 is supplied to a bridge controller 21 through an output terminal 17, and the bridge controller 21 controls a DC motor 22. The DC motor 22 is connected to a frequency divider 23, which provides the feedback clock signal CB representing the rotational speed of the DC motor 22.

A process of synchronizing the feedback clock signal CB with a change in the reference clock signal CF will be explained. The phase comparator 13 detects the phase difference between the signals CF and CB and converts the phase difference into a binary value. The frequency comparator 14 detects the frequency difference between the signals CF and CB and converts the frequency difference into a binary value. The PWM signal generator 16 converts the binary values provided by the comparators 13 and 14 into the PWM signal S16 according to a loop gain provided by the automatic gain controller 15. According to the PWM signal S16, the controller 21 drives the DC motor 22, and the frequency divider 23 provides the feedback clock signal CB representing the driving state of the DC motor 22. These processes are repeated to synchronize the signal CB with the signal CF. The first embodiment of the present invention works on digital signals, so that it requires no analog and digital conversion operations the prior art carries out. Accordingly, the first embodiment simplifies system configuration and standardizes data processing. Unlike the loop filter 105 of the prior art, the automatic gain controller 15 of the first embodiment adjusts a gain at optional timing, to speedily synchronize the signal CB with the signal CF. The loop filter 105 of the prior art must employ external resistors and capacitors. Since the present invention employs no loop filter, it requires no external elements. This results in expanding the range of loop gains to be set. The phase comparator 13, frequency comparator 14, automatic gain controller 15, and PWM signal generator 16 of the first embodiment are simply wired to one another and are controllable by external data. Accordingly, these elements may be integrated into one chip.

Although the PLL system 10 of the first embodiment is used to drive the DC motor 22 in the above explanation, the PLL system 10 is applicable to motors of other kinds and other driving methods. The second, third, and fourth embodiments of the present invention will be explained. These embodiments employ the same PLL system 10 as the first embodiment, to drive a three-phase Hall motor, a DC motor with a constant current, and a three-phase Hall motor with a constant current, respectively.

Figure 3:
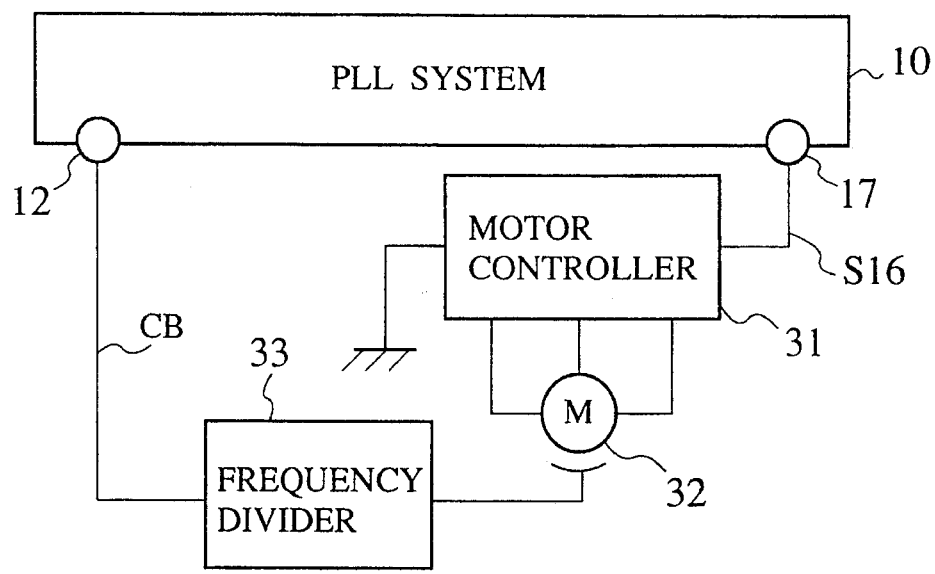
FIG. 3 is a block diagram showing a digital PLL system for driving a three-phase Hall motor, according to a second embodiment of the present invention.

FIG. 3 is a block diagram showing the second embodiment of the present invention. The output terminal 17 of the digital PLL system 10 is connected to a controller 31, which drives a three-phase Hall motor 32. The motor 32 is connected to a frequency divider 33, which is connected to the input terminal 12 of the PLL system 10. The output terminal 17 provides a PWM signal S16, which drives the motor 32 through the controller 31. The frequency divider 33 provides a feedback clock signal CB representing the rotational speed of the motor 32. Same as the first embodiment, the digital PLL system 10 of the second embodiment has a phase comparator for finding the phase difference between the reference clock signal CF and the feedback clock signal CB corresponding to the PWM signal S16 and converting the phase difference into a binary value, a frequency comparator for finding the frequency difference between the signals CF and CB and converting the frequency difference into a binary value, an automatic gain controller, and a PWM signal generator for generating the PWM signal according to the outputs of the phase comparator, frequency comparator, and automatic gain controller. These elements process only digital signals, to simplify the structure of the PLL system and expand the range of loop gains to be set. The second embodiment speedily synchronizes the feedback clock signal CB with the reference clock signal CF when the signal CF is changed.

Figure 4:
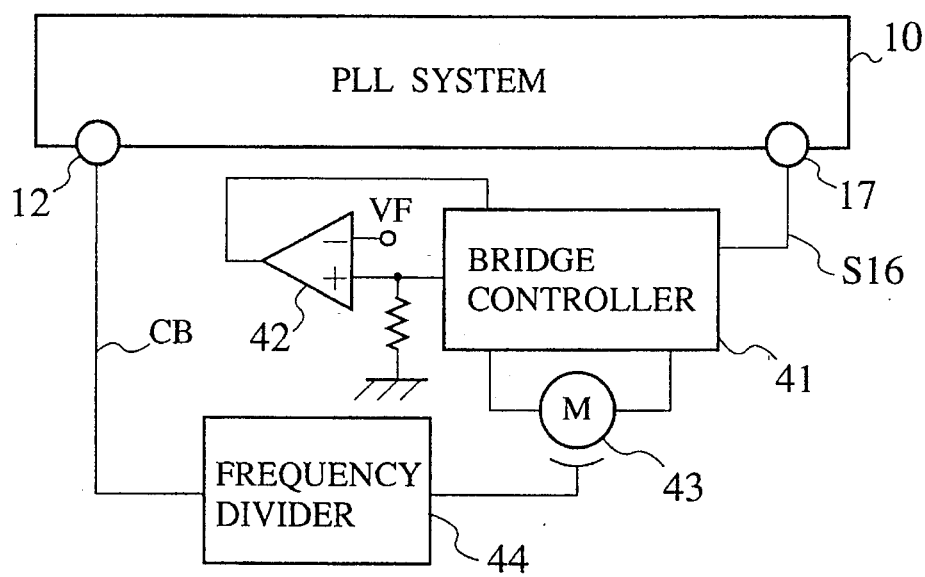
FIG. 4 is a block diagram showing a digital PLL system for driving a DC motor with a constant current, according to a third embodiment of the present invention.

FIG. 4 shows the third embodiment of the present invention. The output terminal 17 of the PLL system 10 is connected to a bridge controller 41. The controller 41 has a comparator 42, which compares the output of the controller 41 with a reference voltage VF and provides the difference between them. According to the difference, the controller 41 drives a DC motor 43 with a constant current. The DC motor 43 is connected to a frequency divider 44, which is connected to the input terminal 12 of the PLL system 10. The output terminal 17 provides a PWM signal S16, which drives the DC motor 43 with a constant current through the controller 41, and the frequency divider 44 provides a feedback clock signal CB representing the rotational speed of the motor 43. The third embodiment of the present invention drives the DC motor 43 with a constant current through the processing of only digital signals. Accordingly, the third embodiment simplifies the structure of the PLL system, expands the range of loop gains to be set, and speedily synchronizes the feedback clock signal CB with the reference clock signal CF when the signal CF is changed.

Figure 5:
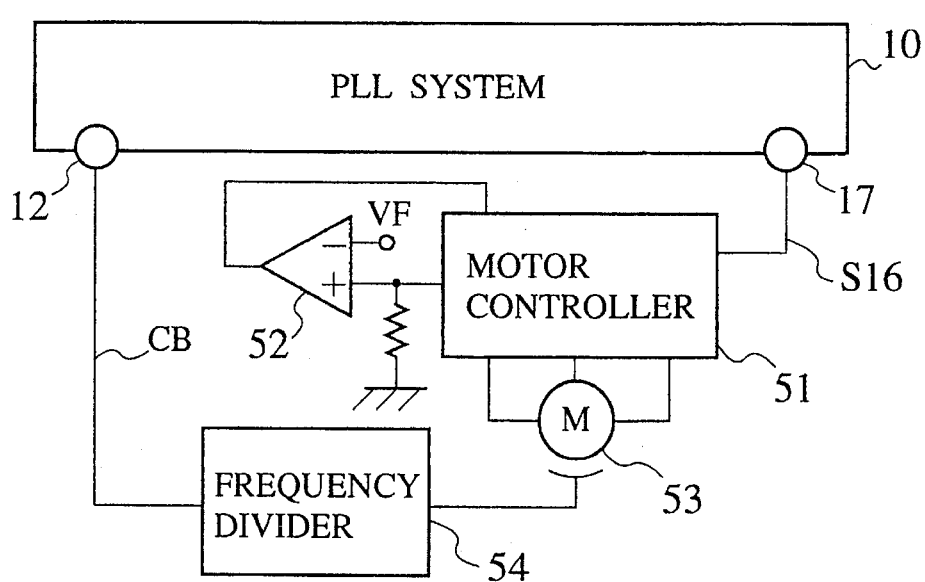
FIG. 5 is a block diagram showing a digital PLL system for driving a three-phase Hall motor with a constant current, according to a fourth embodiment of the present invention.

FIG. 5 shows the fourth embodiment of the present invention. The output terminal 17 of the PLL system 10 is connected to a controller 51. The controller 51 has a comparator 52, which provides the difference between the output of the controller 51 and a reference voltage VF, and according to the difference, the controller 51 drives a three-phase Hall motor 53 with a constant current. The motor 53 is connected to a frequency divider 54, which is connected to the input terminal 12 of the PLL system 10. The output terminal 17 provides a PWM signal S16 according to which the controller 51 drives the motor 53 with a constant current. The frequency divider 54 provides a feedback clock signal CB representing the rotational speed of the motor 53. The fourth embodiment drives the three-phase Hall motor 53 with a constant current through the processing of only digital signals. Accordingly, the fourth embodiment simplifies the structure of the PLL system, expands the range of loop gains to be set, and speedily synchronizes the feedback clock signal CB with the reference clock signal CF when the signal CF is changed.

Various modifications will become possible for those skilled in the art after receiving the teachings of the present disclosure without departing from the scope thereof. For example, in each of the second to fourth embodiments, an output power driver circuit for driving the motor may be separated from the motor controller 31, 41, 51, so that the digital PLL system is integrated into a single chip.

What is claimed is:

1. A PLL system for controlling a load, the PLL system comprising:

(a) an oscillator for generating a reference clock signal;

(b) a phase comparative, connected to the oscillator, for converting the phase difference between the reference clock signal and a feedback clock signal from the load into a first digital signal;

(c) a frequency comparator, connected to the oscillator, for converting the frequency difference between the reference clock signal and a feedback clock signal into a second digital signal;

(d) an automatic gain controller, connected to the frequency comparator, for adjusting a loop gain of the PLL system to a given value whenever the second digital signal outputted from said frequency comparator reaches a change point, and outputting a third digital signal;

(e) a PWM signal generator, connected to the phase comparator, the frequency comparator and the automatic gain controller, for generating a PWM signal according to the digital signals outputted from said phase comparator, frequency comparator, and automatic gain controller; and (f) a load controller, connected to the PWM signal generator, for controlling said load utilizing the PWM signal.

2. The PLL system as recited in claim 1, wherein said load is a motor, said load controller is a motor controller, and the output of said PWM signal generator drives the motor through the motor controller, and a frequency divider connected to the motor provides the feedback clock signal.

3. The PLL system as recited in claim 2, wherein the motor controller is one of a bridge controller for controlling a DC motor and a three-phase Hall motor controller.

4. The PLL system as recited in claim 3, further comprising a comparator connected to the motor controller, for comparing an output voltage of the motor controller with a reference voltage, to generate and drive the motor with a constant current.

* * * * *